(12) United States Patent
Yamamoto et al.

(10) Patent No.: US 11,468,331 B2
(45) Date of Patent: Oct. 11, 2022

(54) NEURAL NETWORK LOAD REDUCTION DEVICE, INFORMATION PROCESSING UNIT, AND NEURAL NETWORK LOAD REDUCTION METHOD AND COMPUTER-READABLE STORAGE MEDIUM

(71) Applicant: Oki Electric Industry Co., Ltd., Tokyo (JP)

(72) Inventors: Kohei Yamamoto, Tokyo (JP); Kurato Maeno, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 728 days.

(21) Appl. No.: 16/434,145

(22) Filed: Jun. 6, 2019

(65) Prior Publication Data
US 2019/0378014 A1    Dec. 12, 2019

(30) Foreign Application Priority Data
Jun. 8, 2018  (JP) .............................. JP2018-110198

(51) Int. Cl.
*G06N 3/08*   (2006.01)
*G06N 3/04*   (2006.01)

(52) U.S. Cl.
CPC ........... *G06N 3/082* (2013.01); *G06N 3/0454* (2013.01); *G06N 3/084* (2013.01)

(58) Field of Classification Search
None
See application file for complete search history.

(56) References Cited

PUBLICATIONS

Chen, SCA-CNN Spatial and Channel-wise Attention in Convolutional Networks for Image Captioning, arXiv, 2017 (Year: 2017).*
He, Channel Pruning for Accelerating Very Deep Neural Networks, arXiv, 2017 (Year: 2017).*
McCaffrey, Neural Network L1 Regularization Using Python, Visual Studio Magazine, 2017 (Year: 2017).*
Liu, Learning Efficient Convolutional Networks through Network Slimming, arXiv, 2017 (Year: 2017).*
Talby, Lessons learned turning machine learning models into real products and services, 2018 (Year: 2018).*

(Continued)

*Primary Examiner* — Brian M Smith
*Assistant Examiner* — Shien Ming Chou
(74) *Attorney, Agent, or Firm* — Rabin & Berdo, P.C.

(57) ABSTRACT

An information processing unit includes: an attention module having an attention layer and a computation section and that is for a neural network including plural levels of layer, the attention layer being configured to compute an output feature corresponding to an input feature from a predetermined layer and based on a parameter; the computation section that multiplies the input feature by the output feature, and outputs a computed result to a layer at a next level; the first learning unit connected to the neural network and that learns the parameter in a state in which learning has been suspended at least for the predetermined layer and the next level layer; and the channel selection section that selects as a redundant channel a channel satisfying a predetermined relationship between the output feature and a predetermined threshold value.

9 Claims, 13 Drawing Sheets

(56) References Cited

PUBLICATIONS

Molchanov, Pruning Convolutional Neural Networks for Resource Efficient Inference, arXiv, 2017 (Year: 2017).*

Hao Li et al., "Pruning Filters for Efficient ConvNets", (online) Mar. 10, 2017, ICLR2017 (search date Jun. 4, 2018), Internet <https://arxiv.org/abs/1608.08710>.

Jian-Hao Luo et al., "Auto Pruner: An End-to-End Trainable Filter Pruning Method for Efficient Deep Model Inference" (online) (search date Jun. 6, 2018), Internet <https://arxiv.org/abs/1805.08941>.

Jian-Hao Luo et al., "ThiNet: A Filter Level Pruning Method for Deep Neural Network Compression", (online) Jul. 20, 2017, ICCV2017 (search date Jun. 4, 2018), Internet <https://arxiv.org/abs/1707.06342>.

* cited by examiner

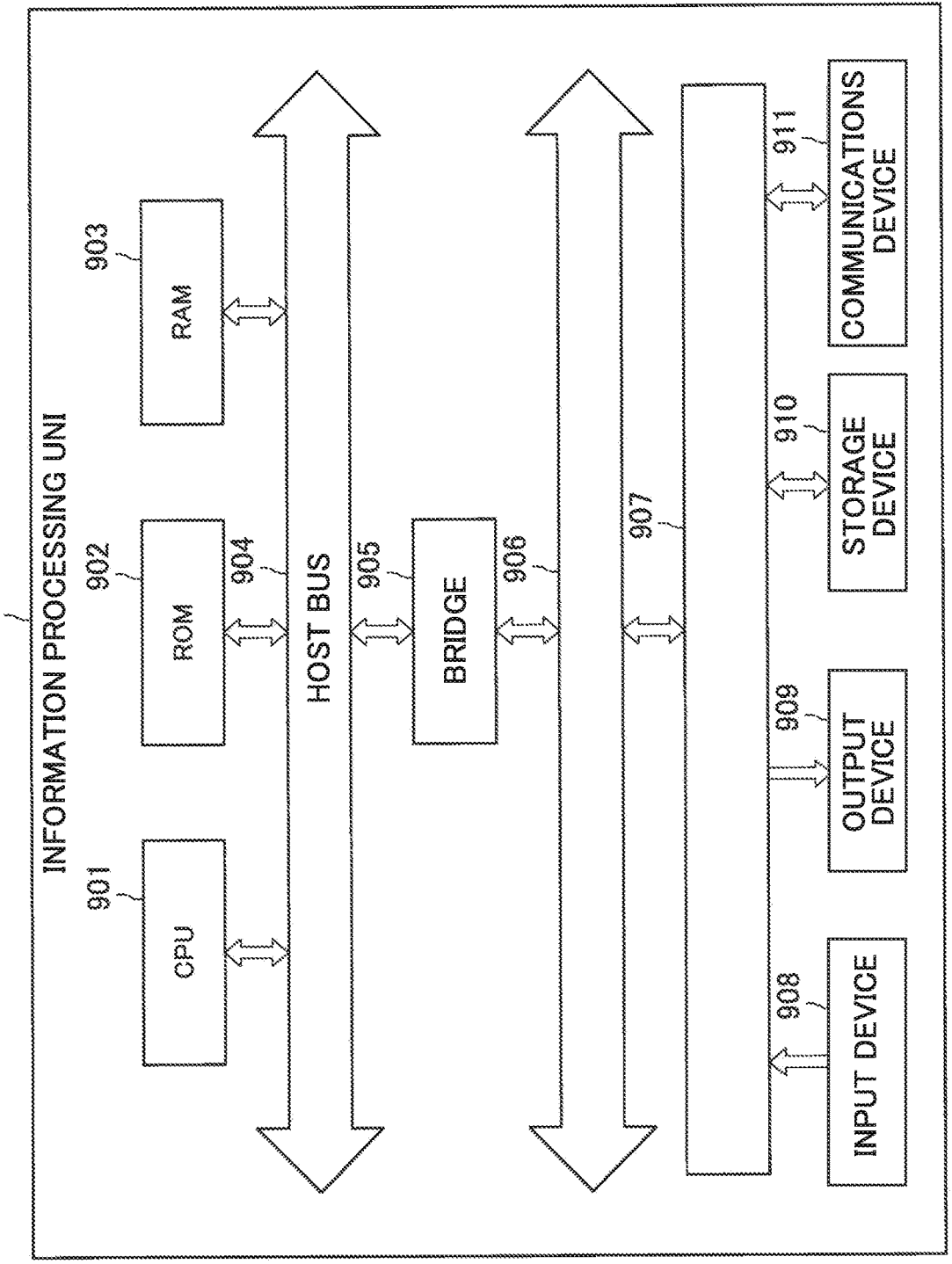

NEURAL NETWORK LOAD REDUCTION DEVICE, INFORMATION PROCESSING UNIT, AND NEURAL NETWORK LOAD REDUCTION METHOD AND COMPUTER-READABLE STORAGE MEDIUM

CROSS-REFERENCE TO RELATED APPLICATION

This application is based on and claims priority under 35 USC 119 from Japanese Patent Application No. 2018-110198 filed on Jun. 8, 2018, which is incorporated by reference herein.

BACKGROUND

Technical Field

The present disclosure relates to a neural network load reduction device, an information processing unit, and a neural network load reduction method and computer-readable storage medium.

Related Art

Neural networks are recently being employed in various fields such as in object detection and the like. However, as progress is being made to increase the functionality of neural networks, there is also a tendency for the number of parameters configuring a neural network to increase. When there are a considerable number of parameters, a load imparted to memory and computation devices during training and during estimating with the neural network also gets larger. There is accordingly research being undertaken into technologies to perform load reduction on neural networks.

For example, there is technology disclosed to reduce the load of filters (weighting filters) in a trained model at each of the layers configuring a neural network by channel units rather than by element units (hereafter sometimes referred to as "pruning") (see, for example, Hao Li and 4 others, "Pruning Filters for Efficient ConvNets", (online) Mar. 10, 2017, ICLR2017 (search date Jun. 4, 2018), Internet <https://arxiv.org/abs/1608.08710> (Non-Patent Document 1), Jian-Hao Luo and 2 others, "ThiNet: A Filter Level Pruning Method for Deep Neural Network Compression", (online) Jul. 20, 2017, ICCV2017 (search date Jun. 4, 2018), Internet <https://arxiv.org/abs/1707.06342> (Non-Patent Document 2), and Jian-Hao Luo and 1 other, "Auto Pruner: An End-to-End Trainable Filter Pruning Method for Efficient Deep Model Inference" (online) (search date Jun. 6, 2018), Internet <https://arxiv.org/abs/1805.08941> (Non-Patent Document 3)).

In such pruning technology, the extent to which filter deletion will be performed needs to be determined in advance for each layer. Namely, in such pruning technology, a compression ratio for each layer needs to be determined in advance. There is accordingly a desire to provide technology capable of obtaining information to automatically perform load reduction efficiently on a neural network without pre-determining a compression ratio for each layer.

SUMMARY

In order to address the issues described above, an aspect of the present disclosure provides a neural network load reduction device including an attention module, a first learning unit, a channel selection section, a deletion section, and a second learning unit. The attention module includes an attention layer and a computation section for a neural network including plural levels of processing layer that are connected together by plural channels. The attention layer is configured to compute an output feature value corresponding to each channel of a first number of channels based on an input feature value from each channel of the first number of channels in a predetermined processing layer and based on a parameter. The computation section is configured to multiply the input feature values by the output feature values and to output a computed result obtained to a processing layer at a next level from the predetermined processing layer. The first learning unit is connected to the neural network and is configured to perform learning processing on the parameter using an error backpropagation method in a state in which learning processing has been suspended at least for the predetermined processing layer and the next level processing layer. The channel selection section is configured to select, as a redundant channel, a channel satisfying a predetermined relationship between the output feature values computed by the attention layer after the learning processing has been performed and a predetermined threshold value. The deletion section is configured to change channels of the first number of channels into channels of a second number of channels by deleting the redundant channel from the predetermined processing layer. The second learning unit is connected to the neural network and is configured to perform learning processing on the neural network after the redundant channel has been deleted.

The attention layer may be configured to compute as the output feature value a result from taking a feature value according to the input feature value and the parameter, and multiplying the feature value by a value obtained by dividing the first number of channels by a predetermined adjustment value. The first learning unit may include a learning adjustment section configured to gradually increase the adjustment value as learning processing is being performed.

The learning adjustment section may be configured to increase the adjustment value by epoch units or iteration units.

The learning adjustment section may be configured to increase the adjustment value more as the first number of channels gets larger.

The channel selection section may be configured to select as the redundant channel a channel in which the output feature value is below the predetermined threshold value.

The neural network load reduction device may further include one each of the attention module, the channel selection section, and the deletion section corresponding to each of the plural processing layers. The second learning unit may be configured to perform learning processing on the neural network after the redundant channel has been deleted from each of the plural processing layers.

The attention modules corresponding to the plural respective processing layers are configured so as to be common to some or all of the processing layers.

The attention modules corresponding to the plural respective processing layers may be configured so as to be different modules.

Another aspect of the present disclosure provides an information processing unit including an attention module, a first learning unit, a channel selection section, and an output section. The attention module includes an attention layer and a computation section and is for a neural network including plural levels of processing layer that are connected together by plural channels. The attention layer is configured to compute an output feature value corresponding to each channel of a first number of channels based on an input feature value from each channel of the first number of channels in a predetermined processing layer and based on a parameter. The computation section is configured to multiply the input feature value by the output feature value, and to output a computed result obtained to a processing layer at a next level from the predetermined processing layer. The first learning unit is connected to the neural network and is configured to perform learning processing on the parameter using an error backpropagation method in a state in which learning processing has been suspended at least for the predetermined processing layer and the next level processing layer. The channel selection section is configured to select, as a redundant channel, a channel satisfying a predetermined relationship between the output feature values computed by the attention layer after the learning processing has been performed and a predetermined threshold value. The output section is configured to perform output according to the output feature values computed by the attention layer after the learning processing has been performed.

Another aspect of the present disclosure provides a neural network load reduction method including: for a neural network including plural levels of processing layers that are connected together by plural channels, computing an output feature value corresponding to each channel of a first number of channels based on an input feature value from each channel of the first number of channels in a predetermined processing layer and based on a parameter, and multiplying the input feature values by the output feature values and outputting a computed result obtained to a processing layer at a next level from the predetermined processing layer; connecting to the neural network and performing learning processing on the parameter using an error backpropagation method in a state in which learning processing has been suspended at least for the predetermined processing layer and the next level processing layer; selecting, as a redundant channel, a channel satisfying a predetermined relationship between the output feature values computed after the learning processing has been performed and a predetermined threshold value; changing channels of the first number of channels into channels of a second number of channels by deleting the redundant channel from the predetermined processing layer; and connecting to the neural network and performing learning processing on the neural network after the redundant channel has been deleted.

Another aspect of the present disclosure provides a computer-readable storage medium storing a program that causes a computer to function as a neural network load reduction device including an attention module, a first learning unit, a channel selection section, a deletion section, and a second learning unit. The attention module includes an attention layer and a computation section for a neural network including plural levels of processing layer that are connected together by plural channels. The attention layer is configured to compute an output feature value corresponding to each channel of a first number of channels based on at least an input feature value from each channel of the first number of channels in a predetermined processing layer and based on a parameter. The computation section is configured to multiply the input feature values by the output feature values and to output a computed result obtained to a processing layer at a next level from the predetermined processing layer. The first learning unit is connected to the neural network and is configured to perform learning processing on the parameter using an error backpropagation method in a state in which learning processing has been suspended at least for the predetermined processing layer and the next level processing layer. The channel selection section is configured to select, as a redundant channel, a channel satisfying a predetermined relationship between the output feature values computed by the attention layer after the learning processing has been performed and a predetermined threshold value. The deletion section is configured to change channels of the first number of channels into channels of a second number of channels by deleting the redundant channel from the predetermined processing layer. The second learning unit is connected to the neural network and is configured to perform learning processing on the neural network after the redundant channel has been deleted.

The present disclosure configured as described above provides technology capable of obtaining information to automatically perform load reduction efficiently on a neural network without pre-determining a compression ratio for each layer.

BRIEF DESCRIPTION OF DRAWINGS

FIG. 15 is a diagram illustrating a hardware configuration of an information processing unit serving as an example of a neural network load reduction device according to an exemplary embodiment of the present disclosure.

DETAILED DESCRIPTION

Figure 1:
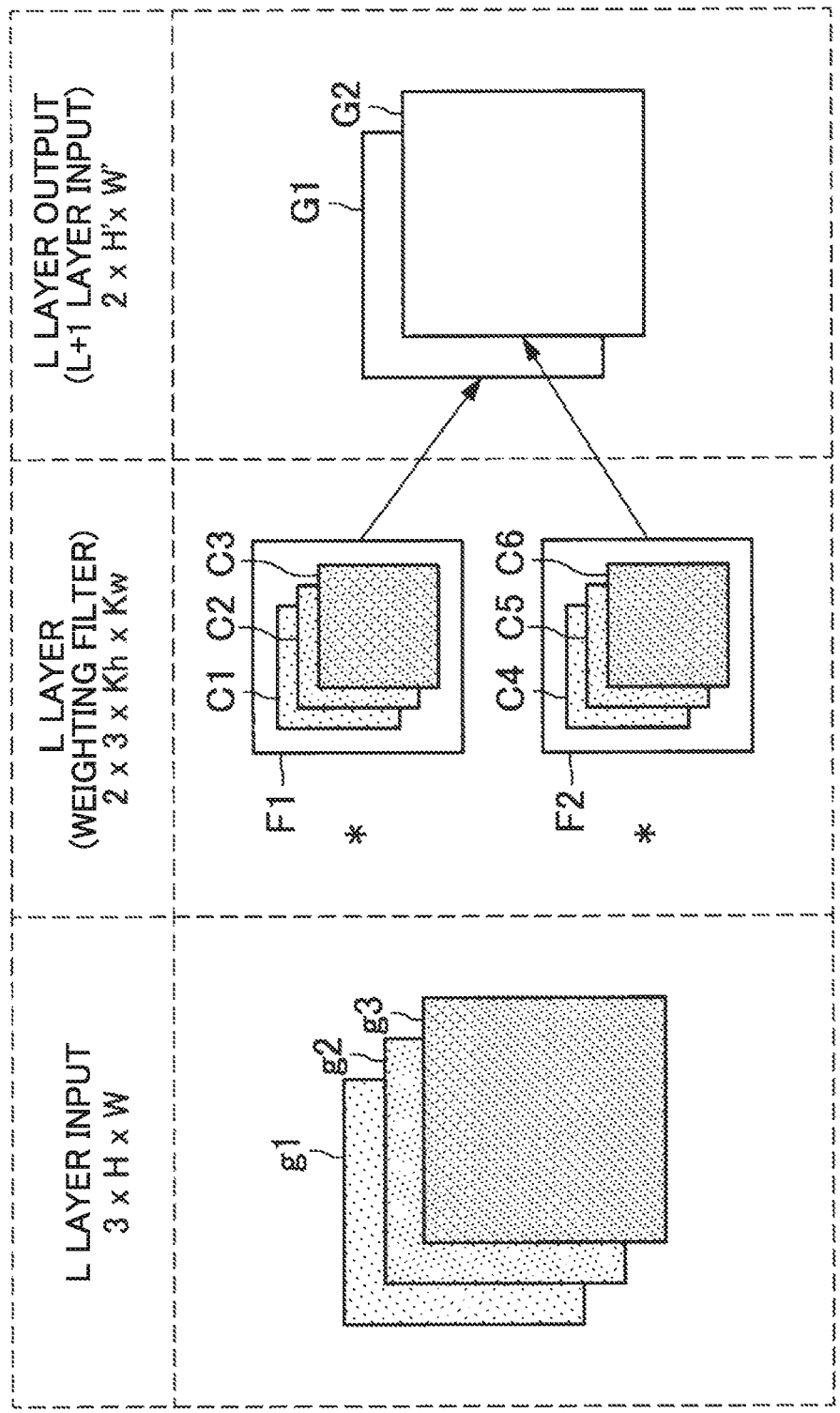
FIG. 1 is a diagram to explain an outline of an exemplary embodiment of the present disclosure.

A detailed description follows regarding a preferable embodiment of the present disclosure, with reference to the appended drawings. Note that configuration elements having substantially the same functional configuration are appended with the same reference numerals in the present specification and drawings, and duplicate description thereof will be omitted.

Moreover, plural configuration elements having substantially the same functional configuration in the present specification and drawings are sometimes discriminated by appending a different suffix after the same reference numeral. However, the same reference numeral alone may be appended when there is no particular need to discriminate between each of the plural configuration elements and the like having substantially the same functional configuration as each other. Moreover, similar configuration elements in different exemplary embodiments are sometimes discriminated by appending a different letter after the same reference numeral. However, the same reference numeral alone may be appended when there is no particular need to discriminate between each of the similar configuration elements and the like of the different exemplary embodiments.

0. Outline

An outline description will first be given of the exemplary embodiment of the present disclosure. Neural networks are recently being used in various fields such as in object detection and the like. However, as progress is being made to increase the functionality of neural networks, there is also a tendency for the number of parameters configuring a neural network to increase. When there are a considerable number of parameters, a load imparted to memory and computation devices during training and during estimating with the neural network also gets larger. There is accordingly research being undertaken into technologies to reduce the load of neural networks.

For example, there is technology disclosed to reduce the load of filters (weighting filters) in a trained model at each of the layers configuring a neural network by channel units rather than by element units (hereafter sometimes referred to as "pruning").

Figure 2:
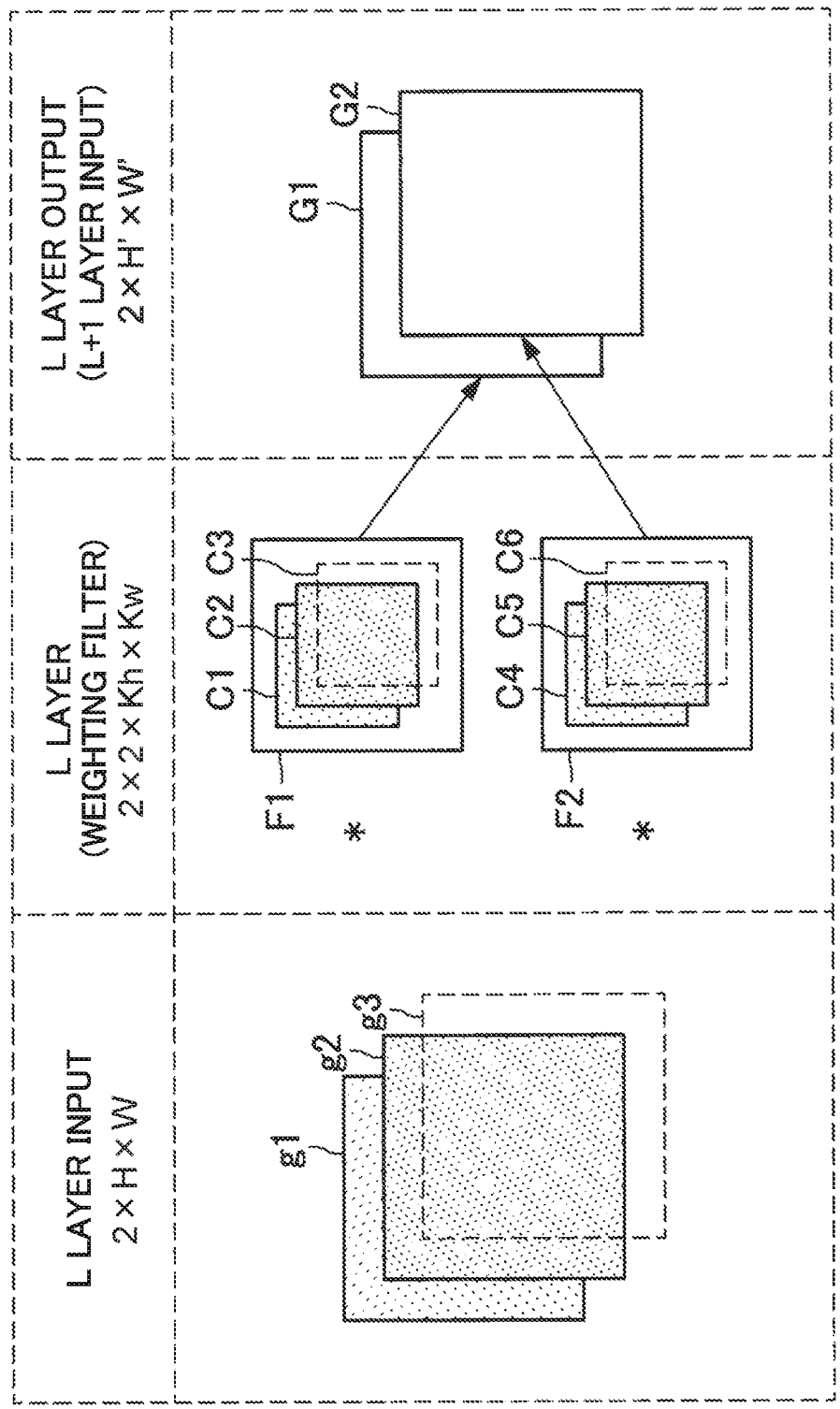
FIG. 2 is a diagram to explain an outline of the same exemplary embodiment.

FIG. 1 and FIG. 2 are diagrams to explain an outline of an exemplary embodiment of the present disclosure. A neural network is envisaged here to be configured by plural levels of processing layer, and description will focus on an L layer from out of the plural levels of processing layer. With reference to FIG. 1, an "L layer input" which is the input to the L layer is indicated, an "L layer (weighting filter)" is indicated, and an "L layer output" which is the output from the L layer is also indicated.

In the example illustrated in FIG. 1, the L layer is configured from two filters (filter F1 and filter F2). Each of the filters in the L layer is configured from three channels (the filter F1 is configured from channels C1 to C3, and the filter F2 is configured from channels C4 to C6)). Input data corresponding to each of the three channels (channel data g1 to g3) is input to each of the filters in the L layer. RGB image data is indicated in FIG. 1 as an example of the input data corresponding to each of the three channels.

Each of the filters in the L layer computes a feature value based on the channel data g1 to g3 and parameters (weightings and biases), and outputs the computed feature value to the L+1 layer (filter F1 outputs feature value G1 to the L+1 layer, and filter F2 outputs feature value G2 to thereto). With reference to FIG. 1, individual dimensions of the "L layer input" are illustrated to be 3 (=number of channels), H (=size in height direction), W (=size in width direction). However, with reference to FIG. 1, individual dimensions of the "L layer filters" are illustrated to be 2 (=number of filters), 3 (=number of channels), Kh (=size in height direction), Kw (=size in width direction), and individual dimensions of the "L layer outputs" are illustrated to be 2 (=number of channels), H' (=size in height direction), W' (=size in width direction).

Next, a case is envisaged in which the channel C3 of the filter F1 is determined to be redundant, and the channel C6 of the filter F2 is also determined to be redundant. In such a case, as illustrated in FIG. 2, the channel C3 and the channel C6 that have been determined to be redundant are deleted. This thereby enables implementation of load reduction on the neural network.

Note that with reference to FIG. 2, accompanying channel deletion in the L layer, the number of channels of the "L layer input" is reduced to two, and the number of channels of the "L layer (weighting filter)" is reduced to two. However, the number of output channels from the "L layer (weighting filter)" remains at two. However, suppose that pruning is also performed in the L+1 layer to reduce the number of channels in the L+1 layer, then the number of output channels from the L layer would also be reduced commensurate to the reduction in the number of channels of the L+1 layer.

In the pruning technology described with reference to FIG. 1 and FIG. 2, generally the extent to which filter deletion will be performed needs to be determined in advance for each layer. Namely, in pruning technology, generally a compression ratio for each layer needs to be determined in advance. The description will now accordingly mainly focus on the technology in the exemplary embodiment to enable information to be obtained for automatically performing efficient load reduction on a neural network, even without determining a compression ratio for each layer in advance.

This concludes the description of an outline of the exemplary embodiment of the present disclosure.

1. Details of Exemplary Embodiment

Next, description follows regarding details of the exemplary embodiment of the present disclosure.

Figure 3:
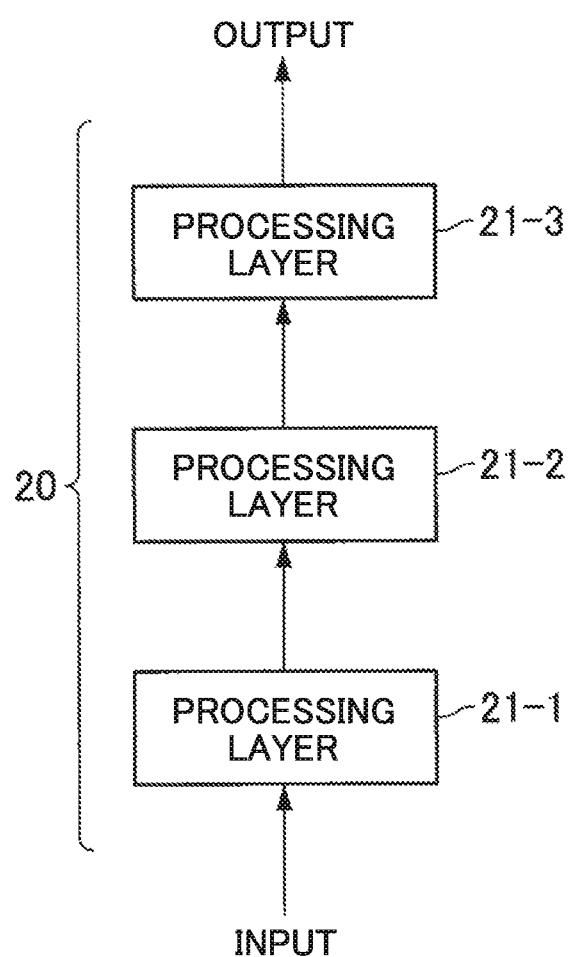
FIG. 3 is a diagram illustrating an example of a configuration of a neural network according to the same exemplary embodiment.

FIG. 3 is a diagram illustrating an example of a configuration of a neural network according to the exemplary embodiment of the present disclosure. As illustrated in FIG. 3, a neural network 20 according to the exemplary embodiment of the present disclosure is configured including plural levels of processing layer 21. As illustrated in FIG. 3, in the exemplary embodiment of the present disclosure, a case is envisaged in which the neural network 20 includes three processing layers 21-1 to 21-3. However, there is no limitation to the number of the processing layers 21 included in the neural network 20, as long as there are plural processing layers.

The processing layers 21-1 to 21-3 are each connected together by plural channels. For example, the processing layer 21-1 is connected to the next level processing layer 21-2 by plural channels (for example, by three channels), and the processing layer 21-2 is also connected to the next level processing layer 21-3 by plural channels (for example, by three channels). However, there is no limitation to the number of channels connecting the processing layers together as long as there are plural channels.

Moreover, the exemplary embodiment of the present disclosure envisages a case in which each of the three processing layers 21-1 to 21-3 included in the neural network 20 is a convolutional layer. However, the type of processing layer included in the neural network 20 is not limited thereto. For example, the neural network 20 may include processing layers that are fully connected layers, or may include processing layers that are not connected to other processing layers.

Each of the processing layers 21-1 to 21-3 includes parameters (weightings and biases) for each channel. The initial values of such parameters may be set by setting with trained data in advance, or may be set by learning processing. Each of the processing layers 21-1 to 21-3 computes a feature value for each channel to be output to the next level, based on the feature value input for each channel from the previous level and based on the respective parameters for the channel. The processing layers 21-1 to 21-3 then output the feature values computed for each channel. In the exemplary embodiment of the present disclosure, an attention layer is connected to the neural network 20 configured as described above, and the attention layer is employed to delete redundant channels. The attention layer will be described later.

Figure 4:
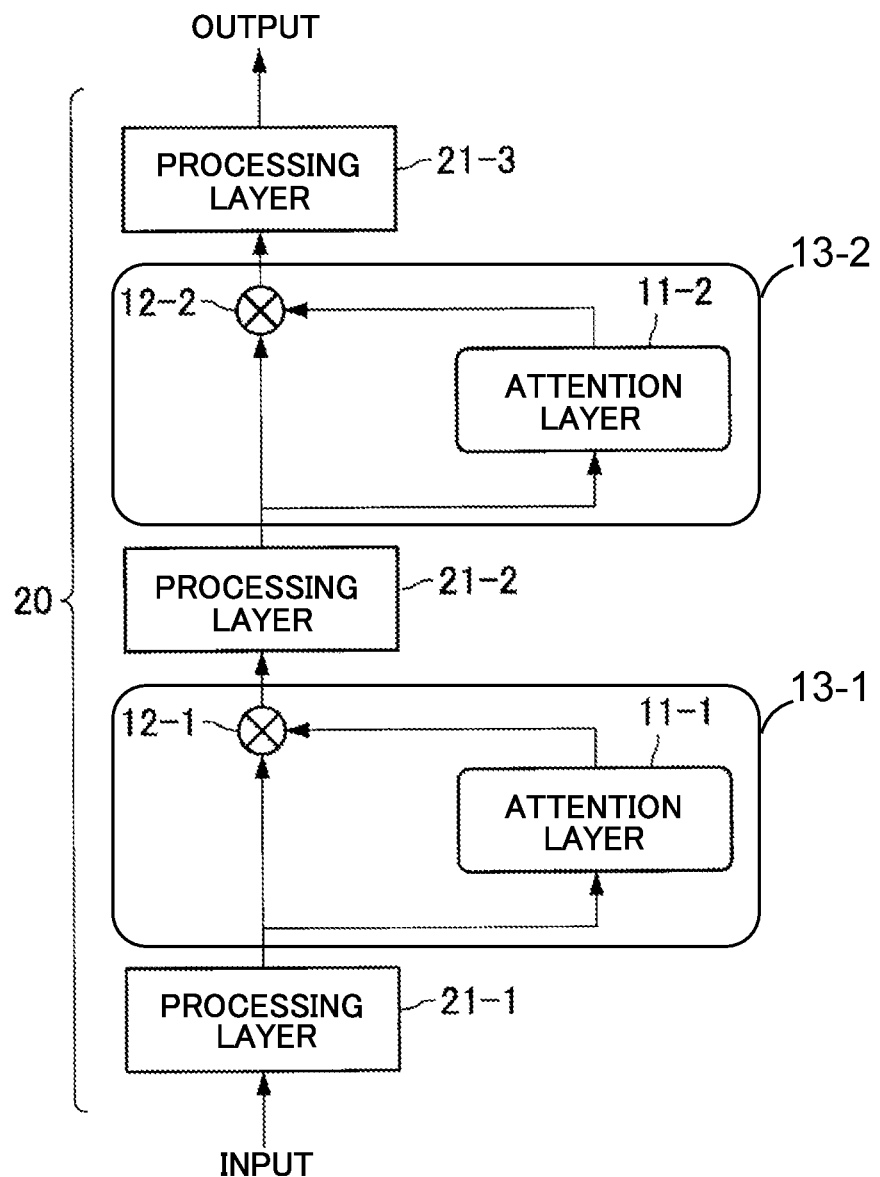
FIG. 4 is a diagram illustrating an example of a neural network to which attention layers according to the second exemplary embodiment are connected.

FIG. 4 is a diagram illustrating an example of the neural network 20 to which attention layers according to the exemplary embodiment of the present disclosure have been connected. In the example illustrated in FIG. 4, attention layers 11 are connected to some of the processing layers 21 in the neural network 20. More specifically, an attention layer 11-1 is connected to the processing layer 21-1, and the attention layer 11-2 is connected to the processing layer 21-2. However, connecting an attention layer 11 to at least one of the processing layers 21 configuring the neural network 20 is sufficient.

For example, the attention layers 11 may be connected to some of the processing layers 21 of the neural network 20. Alternatively, attention layers 11 may be connected to all of the processing layers 21 of the neural network 20. Moreover, attention modules 13 corresponding to each of the plural processing layers 21 may be different modules to each other. In the example illustrated in FIG. 4, the attention module 13-1 and the attention module 13-2, are different modules to each of. Alternatively, an attention module 13 corresponding to each of the plural processing layers 21 may be configured so as to be common to some of, or all of, the plural processing layers 21.

Due to the attention layer 11-1 and the attention layer 11-2 having similar functionality to each other, the following description will mainly focus on the attention layer 11-1, and a detailed description of the attention layer 11-2 will be omitted as appropriate.

Moreover, computation sections 12 are connected to the attention layers 11 and to the next level processing layers 21. With reference to FIG. 4, a computation section 12-1 is connected to the attention layer 11-1 and to the next level processing layer 21-2, and a computation section 12-2 is connected to the attention layer 11-2 and to the next level processing layer 21-3. Note that due to the computation section 12-1 and the computation section 12-2 having similar functionality to each other, the following description will mainly focus on the computation section 12-1, and a detailed description of the computation section 12-2 will be omitted as appropriate.

Figure 5:
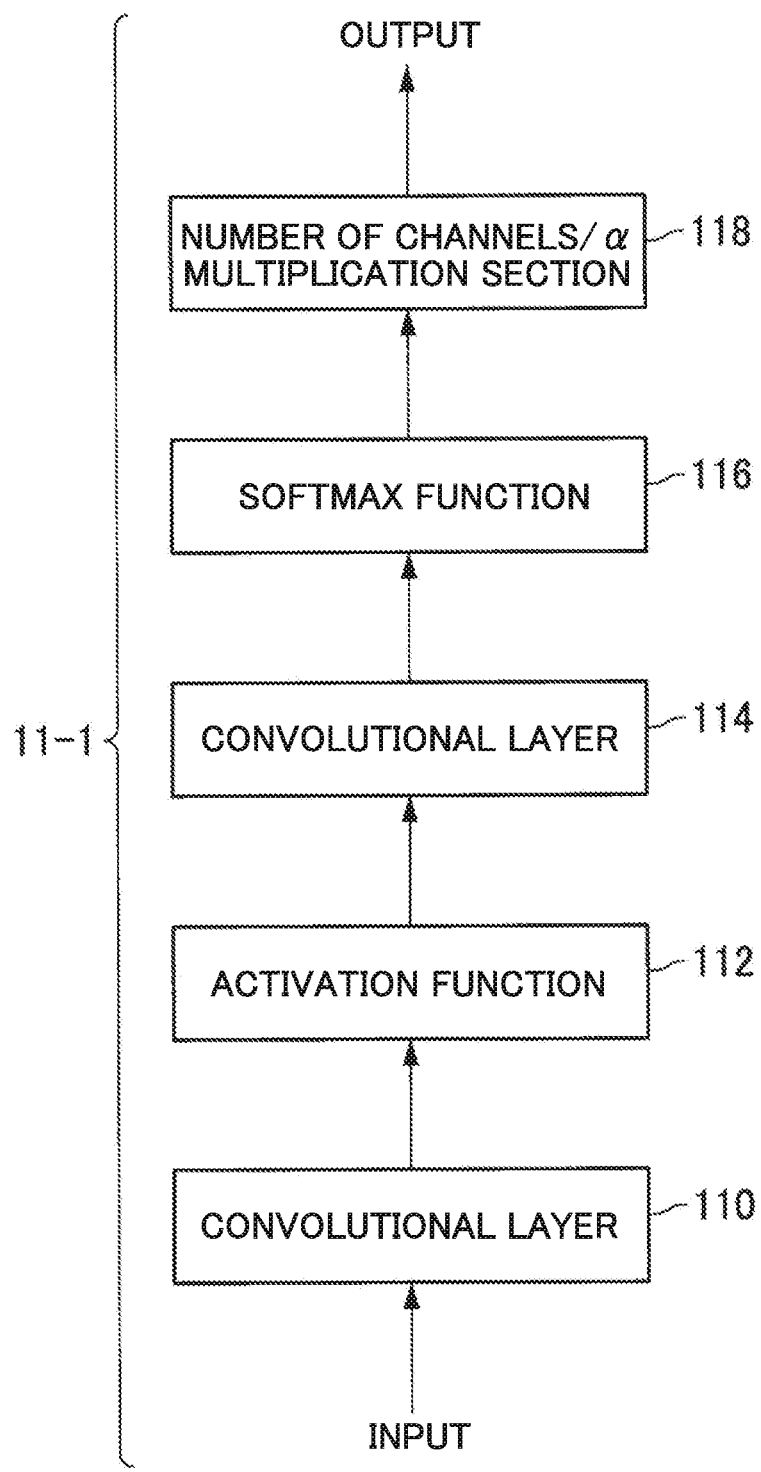
FIG. 5 is a diagram illustrating an example of a configuration of an attention layer.

FIG. 5 is a diagram illustrating an example of a configuration of the attention layer 11-1. With reference to FIG. 5, the attention layer 11-1 includes a convolutional layer 110, an activation function 112, a convolutional layer 114, a Softmax function 116, and a (number of channels/adjustment value α) multiplication section 118. However, examples of the configuration of the attention layer 11-1 are not limited to the example illustrated in FIG. 5. For example, the attention layer 11-1 may include a neural network including learnable parameters, or alternatively may include another neural network including learnable parameters instead of the convolutional layer 110, the activation function 112, and the convolutional layer 114.

The feature values (input feature values) input from the plural channels (for example, three channels) of the processing layer 21-1 are input to the attention layer 11-1. The attention layer 11-1 computes a feature value (output feature value) corresponding to each of the plural channels, based on a feature value (input feature value) input from each of the plural channels (for example, three channels) in the processing layer 21-1 and based on a parameters. Due to channels from the attention layers 11 that have larger output feature values contributing more to precision, such channels are considered to have high importance. Thus in the exemplary embodiment of the present disclosure, channels from the attention layer 11 that have smaller output feature values are deemed to have lower importance, and are accordingly rendered more liable to be deleted.

More specifically, the convolutional layer 110 computes the feature value corresponding to each of the plural channels based on the input feature values of each of the plural channels and based on a parameter of the convolutional layer 110 itself. The activation function 112 takes the feature value corresponding to each of the plural channels, multiplies these feature values by a weighting, and then outputs a sum total thereof. There is no limitation to the type of activation function 112 employed. For example, the activation function 112 may be a sigmoid function, may be a ReLU function, or may be another function. The convolutional layer 114 computes the feature value corresponding to each of the respective plural channels based on the sum total and on a parameter of the convolutional layer 114 itself.

The Softmax function 116 converts the feature value corresponding to each of the plural channels so as to be expressed by a larger value as the feature value becomes larger, and to give a sum total of 1. Employing the Softmax function 116 means that larger feature values are obtained for the higher importance channels, and makes it enables easier to perform inter-channel feature value comparisons due to the constant sum total. The Softmax function 116 is expressed as function (1), below, wherein i is the channel number, and xi is the respective feature value. Σ indicates a total value for all channels.

$$\exp(xi)/\Sigma(\exp(xi)) \qquad (1)$$

Note that another function may be employed in place of the Softmax function 116. For example, if f is a given function for conversion such that larger feature values are expressed by larger values, and such that feature values taking a negative value are converted into positive values, then the function (2) below may be employed instead of the Softmax function 116.

$$f(xi)/\Sigma(f(xi)) \qquad (2)$$

The number of channels/a (=adjustment value) multiplication section 118 takes a feature value computed based on the feature value (input feature value) input from each of the plural channels (for example, three channels) in the processing layer 21-1 and based on the parameter, and computes output feature values resulting from multiplying these computed feature values by the number of channels divided by a predetermined adjustment value α.

Thus the exemplary embodiment of the present disclosure is configured such that channels having smaller output feature values from the attention layer 11-1 are deemed to be of lower importance, and are accordingly rendered more liable to be deleted. However, were the output (output feature values) from the Softmax function to be unmodified when multiplied by the input feature values from the processing layer 21-1, then there would sometime be cases in which many channels were suddenly deleted, resulting in the loss of an ability to effectively perform learning processing using a first learning unit 16. It is accordingly desirable to gradually decrease the output feature values employed to multiply the input feature values from the processing layer 21-1.

More specifically, a learning adjustment section 17 may be configured to gradually increase the adjustment value $\alpha$ as learning processing is being performed with the first learning unit 16. When this is being performed, the adjustment value $\alpha$ may be changed so as to lie in a range from 1 to the number of channels. For example, in case in which the output feature values from the attention layer 11-1 are largest when the adjustment value $\alpha=1$ (assuming a uniform output from the Softmax function for all channels, then the output feature value of each channel from the attention layer 11-1 would be 1).

Figure 6:
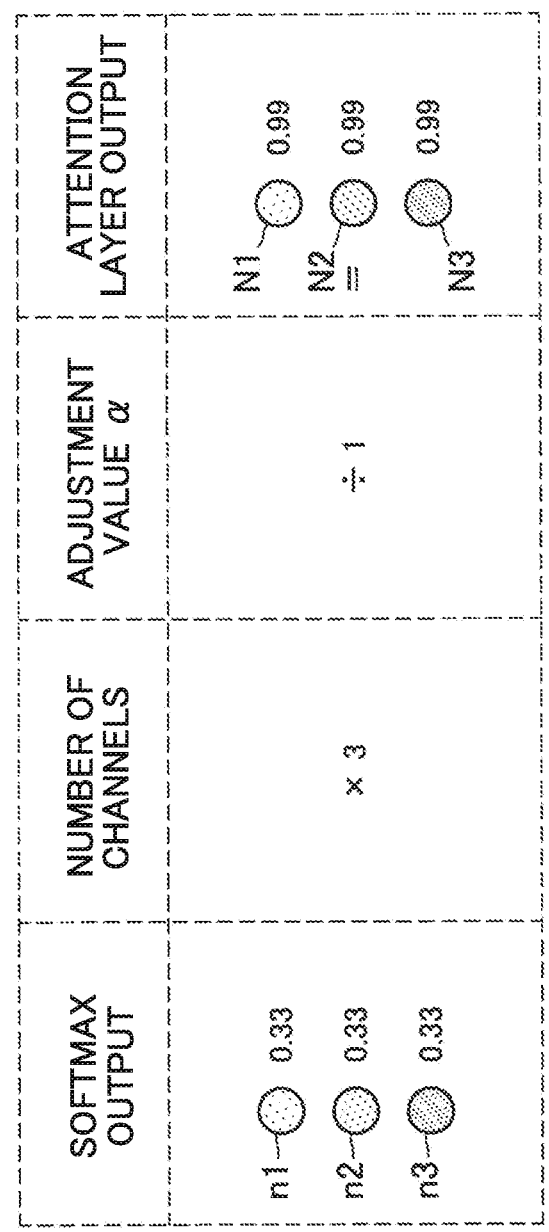
FIG. 6 is a diagram illustrating an example of a case in which an adjustment value is 1.

FIG. 6 is a diagram illustrating an example when the adjustment value $\alpha=1$. With reference to FIG. 6, the Softmax outputs n1 to n3 from the three channels are each "0.33", the number of channels is "3", and the adjustment value $\alpha$ is "1". The number of channels/$\alpha$ (=adjustment value) multiplication section 118 accordingly computes attention layer outputs N1 to N3 corresponding to the three channels by taking the Softmax outputs n1 to n3 of "0.33" from each of the three channels, and multiplying these by the value "3" found by dividing the number of channels by the predetermined adjustment value $\alpha$, to give multiplication results of "0.99" for attention layer outputs N1 to N3.

However, in a case in which the adjustment value $\alpha$="number of channels", then the output from the Softmax function would be unmodified as the output feature values to be output from the attention layer 11-1.

There is no limitation to the timing to update the adjustment value $\alpha$. For example, the learning adjustment section 17 may increase the adjustment value $\alpha$ at the timing of each repeated execution with the same data set (namely, may increase the adjustment value $\alpha$ in epoch units).

Figure 7:
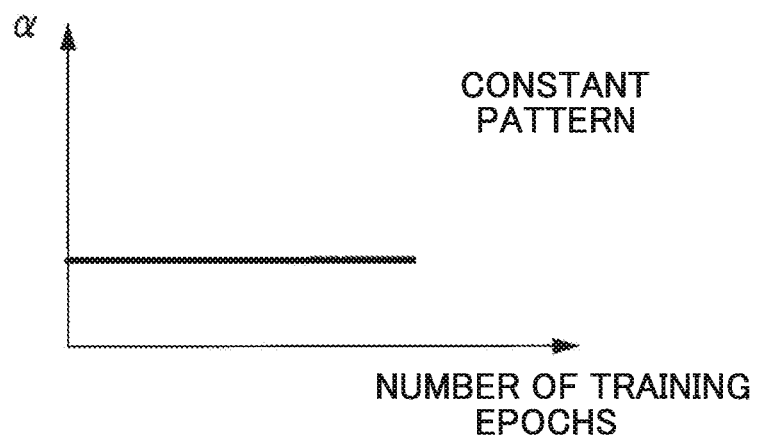
FIG. 7 is a diagram illustrating an example of a pattern by which an adjustment value is changed.
Figure 8:
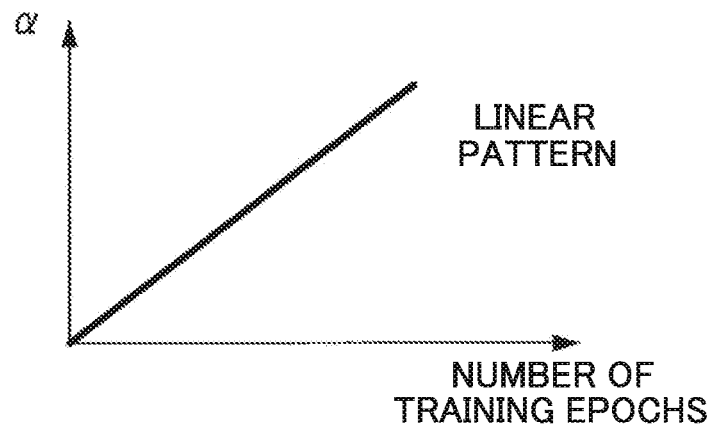
FIG. 8. is a diagram illustrating an example of a pattern by which an adjustment value is changed.
Figure 9:
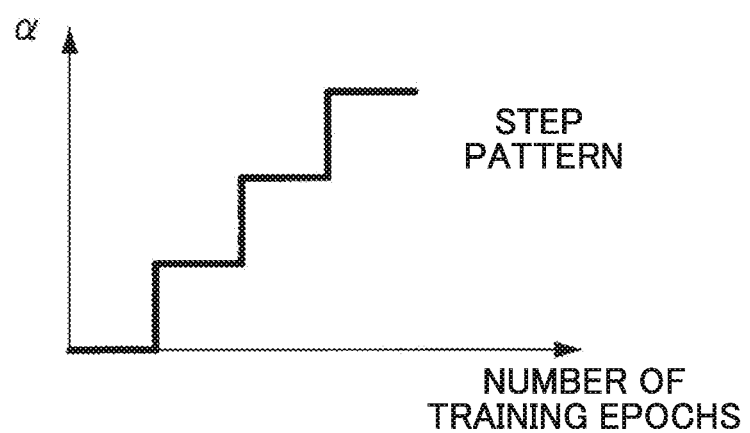
FIG. 9 is a diagram illustrating an example of a pattern by which an adjustment value is changed.

FIG. 7 to FIG. 9 are diagrams illustrating examples of patterns for changing the adjustment value $\alpha$. FIG. 7 illustrates a case in which the adjustment value $\alpha$ remains constant even when the number of epochs increases (i.e. a constant pattern). FIG. 8 illustrates a case in which the adjustment value $\alpha$ increases linearly as the number epochs increases (i.e. a linear pattern). FIG. 9 illustrates a case in which the adjustment value $\alpha$ is increased by a predetermined amount as the number of epochs increases (i.e. a step pattern). However, the pattern for changing the adjustment value $\alpha$ is not limited to these examples. For example, as the number of epochs increases, the learning adjustment section 17 may increase the adjustment value $\alpha$ monotonically, may increase the adjustment value $\alpha$ quadratically, or may increase the adjustment value $\alpha$ logarithmically.

Alternatively, the learning adjustment section 17 may increase the adjustment value $\alpha$ at the timing of each update in data set (namely, may increase the adjustment value $\alpha$ in iteration units).

The initial values of the adjustment value $\alpha$ may be fixed irrespective of the circumstances, or may be varied according to the circumstances. For example, the learning adjustment section 17 may change the initial values of the adjustment value $\alpha$ according to the number of channels. More specifically, the learning adjustment section 17 may increase the adjustment value $\alpha$ as the number of channels increases.

Adopting such an approach means that there is no need for that much change in the "value resulting from dividing the number of channels by the predetermined adjustment value $\alpha$" with circumstances.

Note that the exemplary embodiment of the present disclosure mainly envisages case in which there are the same number of input feature values to the attention layer 11-1 as the number of output feature values from the attention layer 11-1. However, these need not always be the same number. For example, the number of output feature values from the attention layer 11-1 may be smaller than the number of input feature values to the attention layer 11-1 (namely, the attention layer 11-1 may compute feature values corresponding to only some channels out of the plural channels, and to not compute feature values corresponding to the remaining channels.

Figure 10:
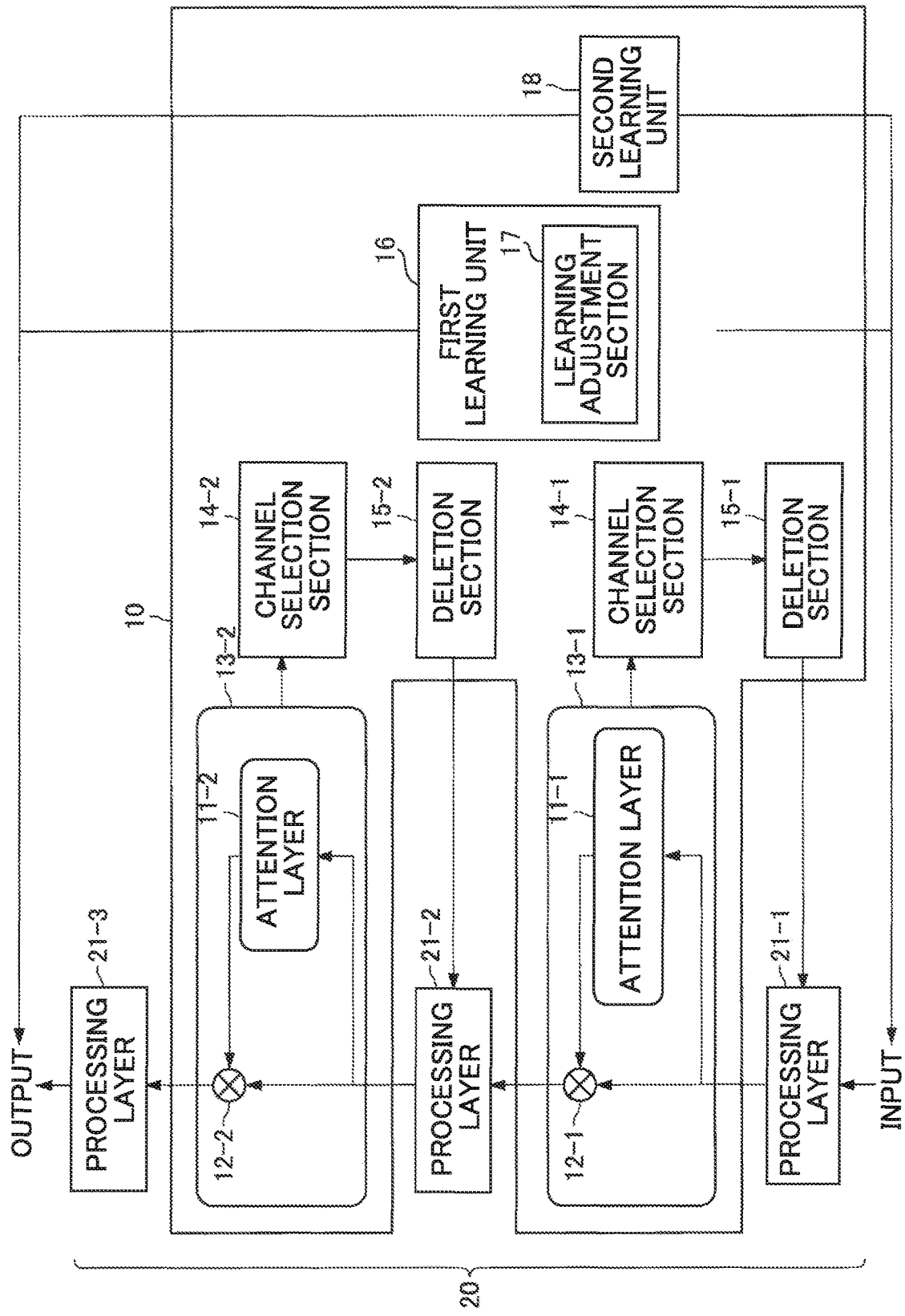
FIG. 10 is a diagram illustrating an example of a functional configuration of a neural network load reduction device according to the same exemplary embodiment.

FIG. 10 is a diagram illustrating an example of a functional configuration of a neural network load reduction device according to the exemplary embodiment of the present disclosure. As illustrated in FIG. 10, a neural network load reduction device 10 includes plural attention modules 13 (attention module 13-1 and attention module 13-2), plural channel selection sections 14 (channel selection section 14-1 to 14-2), plural deletion sections (deletion sections 15-1 to 15-2), a first learning unit 16, and a second learning unit 18.

The neural network load reduction device 10 includes a computation device such as a central processing unit (CPU), and the functionality of the neural network load reduction device 10 is realized by a program stored in non-illustrated memory being expanded into random access memory (RAM) by the CPU and executed. Note that this program may also be recorded and provided on a computer-readable recording medium. Alternatively, the neural network load reduction device 10 may be configured by dedicated hardware, or may be configured by a combination of plural items of hardware.

Each of the plural attention modules 13 includes a corresponding attention layer 11 and a corresponding computation section 12. More specifically, the attention module 13-1 includes the attention layer 11-1 and the computation section 12-1, and the attention module 13-2 includes the attention layer 11-2 and the computation section 12-2. The first learning unit 16 includes the learning adjustment section 17.

The computation section 12-1 multiplies the feature values (input feature values) input from a processing layer 21-1 by the feature values (output feature values) output from the attention layer 11-1 on a per-channel basis. The computation section 12-1 outputs the computation results obtained by multiplication for each channel to the next level processing layer 21-2. Similarly, the computation section 12-2 multiplies the feature values (input feature values) input from a processing layer 21-2 by the feature values (output feature values) output from the attention layer 11-2 on a per-channel basis. The computation section 12-2 outputs the computation results obtained by multiplication for each channel to the next level processing layer 21-3.

The first learning unit 16 is connected to the neural network 20, and performs learning processing on the attention layers 11 (more specifically, on the parameters in each of a convolutional layer 110 and a convolutional layer 114 of the attention layer 11) using an error backpropagation method in a state in which learning processing has been suspended at least for the processing layer subject to pruning. More specifically, the first learning unit 16 computes as error values of squares of differences between outputs y from the neural network 20 and training data t, and then performs backpropagation on the computed error. When doing so, the respective parameters in the processing layers 21-1 to 21-3 configuring the neural network 20 are fixed and not subjected to learning processing. Note that although in the present exemplary embodiment the learning processing is suspended for all the processing layers 21-1 to 21-3 contained in the neural network 20, a configuration may be adopted in which learning processing is suspended for only some processing layers out of the plural processing layers to include at least the processing layer subjected to pruning.

Figure 11:
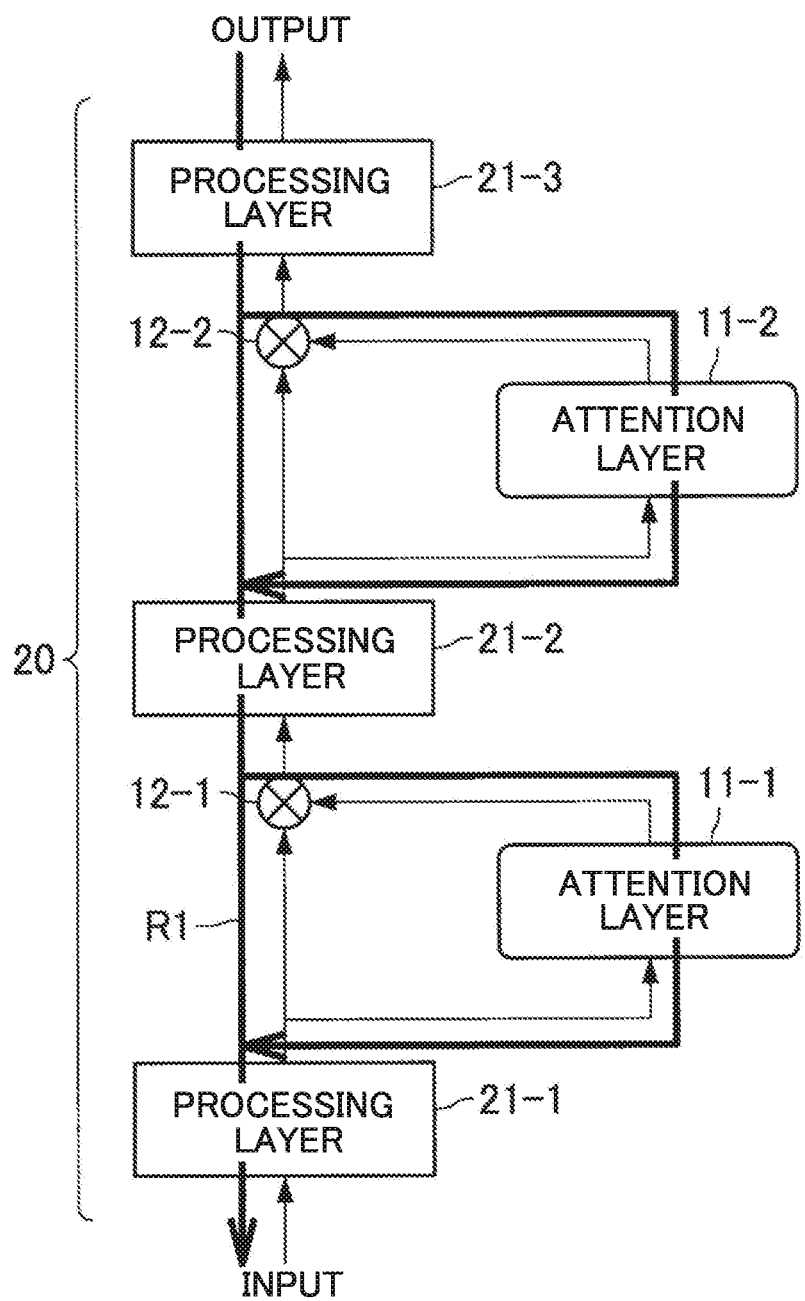
FIG. 11 is a diagram illustrating an example of an error propagation route.

FIG. 11 is a diagram illustrating an example of an error propagation route. With reference to FIG. 11, an example of an error propagation route R1 is illustrated. The first learning unit 16 backpropagates the computed error along the error propagation route R1. Specifically, the first learning unit 16 computes parameters (of the convolutional layer 110 and the convolutional layer 114) for each of the attention layer 11-2 and the attention layer 11-1 so as to minimize an error function. The parameters in the attention layer 11-2 and the attention layer 11-1 are then respectively updated by learning processing by the first learning unit 16.

Figure 12:
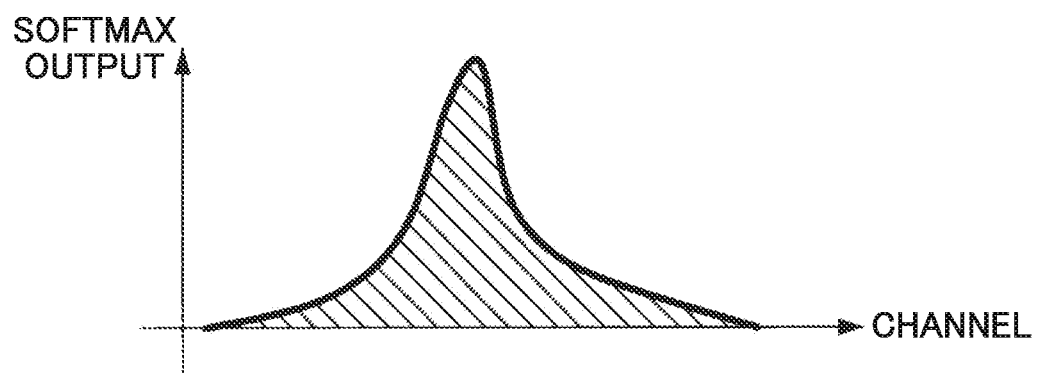
FIG. 12 is a diagram illustrating an example of a feature value output from a Softmax function after learning processing has been performed by a first learning unit.

FIG. 12 is a diagram illustrating an example of feature values output from the Softmax function 116 after learning processing has been performed by the first learning unit 16. As illustrated in FIG. 12, output (output feature values) are obtained from the Softmax function corresponding to the plural respective channels.

The channel selection section 14-1 selects as a redundant channel a channel satisfying a predetermined relationship between the output feature values computed by the attention layer 11-1 after the learning processing has been performed by the first learning unit 16, and a predetermined threshold value. For example, a channel having an output feature value below the threshold value is considered to not be of much importance. The channel selection section 14-1 accordingly selects as a redundant channel a channel having output feature values computed by the attention layer 11-1 below the threshold value.

Figure 13:
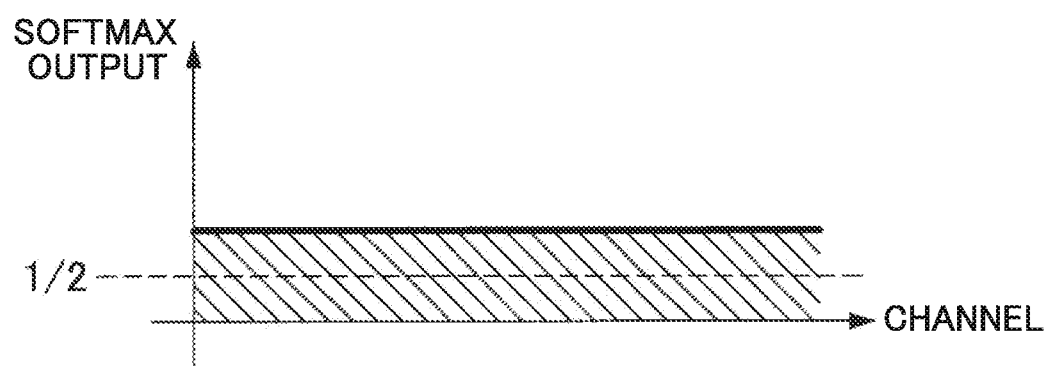
FIG. 13 is a diagram illustrating an example of a threshold value.

FIG. 13 is a diagram illustrating an example of a threshold value. With reference to FIG. 13, the outputs (output feature values) of the Softmax function corresponding to all the respective channels are the same as each other Namely, the importance of all of the channels is the same. For example, the channel selection section 14-1 may employ 1/(2×number of channels) as a threshold value, and select as a redundant channel a channel whose output feature values expressed by a statistic computed by the attention layer 11-1 is below this threshold value. This enables an efficient number of redundant channels to be selected. The selection of a redundant channel by the channel selection section 14-2 is executed in a similar manner. The statistic referred to here is a expressed as a multi-level continuous value, and is, for example, an average value and deviation, central value, or the like found from at least two items of input data. The output feature values change depending on the input data to the attention layer, and finding a statistic thereof enables this dependency to be suppressed. Furthermore, the statistic directly expresses the importance of each of the channels, and so may be utilized as explanatory evidence for pruning determination.

The description now continues while returning to FIG. 10. The deletion section 15-1 deletes redundant channels from the processing layer 21-1 corresponding to the attention layer 11-1. The deletion section 15-1 thereby reduces the number of channels of the processing layer 21-1 that correspond to the attention layer 11-1 (namely, changes from channels of a first number of channels to channels of a second number of channels). Such a configuration enables load reduction to be efficiently performed automatically on the neural network 20, without determining a compression ratio of the processing layer 21-1 in advance. Redundant channel deletion by the deletion section 15-2 is executed in a similar manner.

Figure 14:
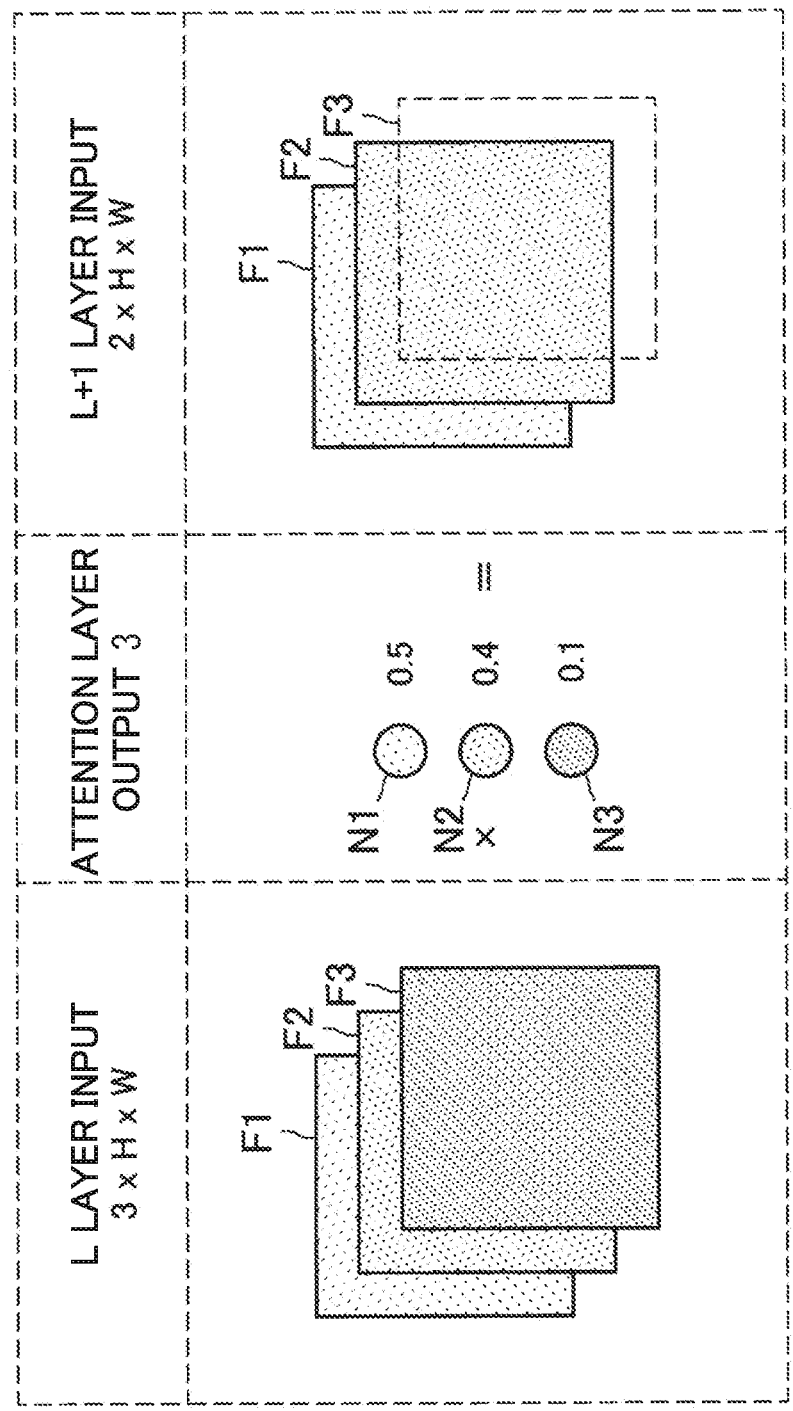
FIG. 14 is a diagram illustrating an example in which a redundant channel is deleted.

FIG. 14 is a diagram illustrating an example in which a redundant channel is deleted. With reference to FIG. 14, individual dimensions of the "L layer output" are illustrated as being 3 (=number of channels), H (=size in height direction), and W (=size in width direction). However, with reference to FIG. 14, the dimensions of the "attention layer output" are illustrated as three (number of channels), with the output for each channel illustrated as being an output N1 "0.5", an output N2 "0.4", and an output N3 "0.1". Individual dimensions of the "L+1 layer input" are illustrated as being 2 (number of channels), H (=size in height direction), W (=size in width direction).

Description continues while returning to FIG. 10. The second learning unit 18 is connected to the neural network 20, and learning processing is performed on the neural network 20 after redundant channel deletion by the deletion section 15-1 and the deletion section 15-2. More specifically, the second learning unit 18 performs learning processing on respective parameters in the processing layers 21-1 to 21-3 of the neural network 20 after redundant channel deletion by the deletion section 15-1 and the deletion section 15-2.

As described above, the learning processing by the first learning unit 16, the redundant channel selection by the channel selection sections 14-1 to 14-2, the redundant channel deletion by the deletion sections 15-1 to 15-2, and the learning processing by the second learning unit 18, are executed in this sequence plural times. This processing is ended after being executed once or plural times. There is no particular limitation to the conditions for ending processing. For example, this processing may be ended when there is no longer a channel whose output feature values are below the threshold value.

This concludes the detailed description of the exemplary embodiment of the present disclosure.

2. Hardware Configuration Example

Description follows regarding an example of a hardware configuration of the neural network load reduction device 10 according to the exemplary embodiment of the present disclosure. In the following description, an example of a hardware configuration of an information processing unit 900 is described as an example of a hardware configuration of the neural network load reduction device 10 according to the exemplary embodiment of the present disclosure. Note that the example of the hardware configuration of the information processing unit 900 described below is merely an example of a hardware configuration of the neural network load reduction device 10. The hardware configuration of the neural network load reduction device 10 may accordingly be achieved by removing unwanted configuration from the hardware configuration of the information processing unit 900 described below, or may be achieved by adding new configuration thereto.

FIG. 15 is a diagram illustrating a hardware configuration of the information processing unit 900 serving as an example of the neural network load reduction device 10 according to the exemplary embodiment of the present disclosure. The information processing unit 900 includes a central processing unit (CPU) 901, read only memory (ROM) 902, random access memory (RAM) 903, a host bus 904, a bridge 905, an external bus 906, an interface 907, an input device 908, an output device 909, a storage device 910, and a communications device 911.

The CPU 901 functions as a computational processing device and a control device, and controls overall operations inside the information processing unit 900 according to various programs. The CPU 901 may be a microprocessor. The ROM 902 stores programs, computation parameters, and the like for use by the CPU 901. The RAM 903 temporarily stores programs to be used in execution by the CPU 901, and temporarily stores parameters and the like that are appropriately changed by such execution. These components are connected to each other by the host bus 904 configured by a CPU bus or the like.

The host bus 904 is connected via the bridge 905 to the external bus 906 configured by a Peripheral Component Interconnect/Interface (PCI) bus or the like. Note that the host bus 904, the bridge 905, and the external bus 906 are not necessarily separate configurations, and a configuration may be adopted in which the functionality thereof is implemented by a single bus.

The input device 908 is configured including an input unit for a user to input information with, such as a mouse, keyboard, touch panel, button, microphone, switch, a lever, or the like, and an input control circuit to generate an input signal based on the input by the user, and to output to the CPU 901. By operating the information processing unit 900, the user is able to input various data to the information processing unit 900 and to instruct processing operations by operating the input device 908.

The output device 909 includes, for example, a display device such as a cathode ray tube (CRT) display device, an liquid crystal display (LCD) display, an organic light emitting diode (OLED) device, or a lamp, and an audio output device such as a speaker.

The storage device 910 is a device employed for data storage. The storage device 910 may include a storage medium, a recording device to record data on the storage medium, a reading device to read data from the storage medium, an erasing device to erase data recorded on the storage medium, and the like. The storage device 910 is, for example, configured by a hard disk drive (HDD). The storage device 910 drives a hard disk, and stores programs executed by the CPU 901 and various data.

The communications device 911 is a communication interface configured, for example, by a communication device or the like for connecting to a network. The communications device 911 may be compatible with wireless communication, and may be compatible with wired communication.

This concludes the description of an example of a hardware configuration of the neural network load reduction device 10 according to the exemplary embodiment of the present disclosure.

3. Conclusion

As described above, the exemplary embodiment of the present disclosure provides a neural network load reduction device including an attention module. The attention module includes an attention layer and a computation section for a neural network including plural levels of processing layer that are inter-connected by plural channels. The attention layer is configured to compute an output feature value corresponding to each channel out of a first number of channels based on at least an input feature value from each channel of the first number of channels in a predetermined processing layer and based on a parameter. The computation section is configured to multiply the input feature value by the output feature value, and to output the computed result obtained thereby to a processing layer at a next level from the predetermined processing layer.

The neural network load reduction device includes a first learning unit, a channel selection section, a deletion section, and a second learning unit. The first learning unit is connected to the neural network and is configured to perform learning processing on a parameter using an error back-propagation method in a state in which learning processing has been suspended at least for the predetermined processing layer and the next level processing layer. The channel selection section is configured to select as a redundant channel a channel satisfying a predetermined relationship between the output feature values computed by the attention layer after the learning processing has been performed and a predetermined threshold value. The deletion section is configured to change channels of the first number of channels into channels of a second number of channels by deleting the redundant channel from the predetermined processing layer. The second learning unit is connected to the neural network and is configured to perform learning processing on the neural network after the redundant channel has been deleted.

Adopting such a configuration enables information to be obtained to automatically perform load reduction efficiently on the neural network without determining a compression ratio of each layer in advance.

Although details have been described above of a preferable exemplary embodiment of the present disclosure, with reference to the appended drawings, the present disclosure is not limited to this example. It will be clear to a person of ordinary skill in the art of the present disclosure that various modifications and improvements may be obtained within the scope of the technological concept recited by the scope of the patent claims, and these should obviously be understood as belonging to the range of technology of the present disclosure.

For example, the description above mainly relates to a case in which attention layer connections are made to all of the processing layers. However, a configuration may be adopted in which attention layer connections are only made to some of the processing layers. For example, in a case in which individual dimensions of a processing layer are C (=number of filters), D (=number of channels), H (=size in height direction), W (=size in width direction), then a configuration may be adopted in which attention layers are connected for each D (=number of channels). Alternatively, a configuration may be adopted in which attention layers are connected for each H (=size in height direction) and W (=size in width direction).

Moreover, an information processing unit may be provided that includes the attention module described above, a first learning unit, a channel selection section, and an output section to perform output according to an output feature value computed by the attention layer after learning processing has been performed by the first learning unit. Such an output section may output for each channel an unmodified output feature value as computed by the attention layer, or may output information regarding a relative inter-channel magnitude of the output feature values computed by the attention layer. Such an output section enables information (importance of each channel) to be obtained to automatically perform load reduction efficiently on the neural network, without determining the compression ratio for each layer in advance.

What is claimed is:

1. A neural network load reduction device comprising:
a computation device; and
a non-transitory storage medium having program instructions stored thereon, execution of which by the computation device causes the neural network load reduction device to provide functions of:
  an attention module including
    an attention layer for a neural network, the neural network including a plurality of levels of processing layers that are connected together by a plurality of channels, the attention layer being configured to compute an output feature value corresponding to each channel of a first number of channels based on an input feature value from each channel of the first number of channels in a predetermined processing layer and based on a parameter, and
    a computation section configured to multiply the input feature values by the output feature values and to output a computed result obtained to a processing layer at a next level from the predetermined processing layer;
  a first learning unit connected to the neural network and configured to perform learning processing on the parameter using an error backpropagation method in a state in which learning processing has been suspended at least for the predetermined processing layer and the processing layer at the next level;
  a channel selection section configured to select, as a redundant channel, a channel satisfying a predetermined relationship between the output feature values computed by the attention layer after the learning processing has been performed and a predetermined threshold value;
  a deletion section configured to change channels of the first number of channels into channels of a second number of channels by deleting the redundant channel from the predetermined processing layer; and
  a second learning unit connected to the neural network and configured to perform learning processing on the neural network after the redundant channel has been deleted, wherein
  the attention layer is configured to compute, as the output feature value, a result from taking a feature value according to the input feature value and the parameter, and to multiply the feature value by a value obtained by dividing the first number of channels by a predetermined adjustment value; and
  the first learning unit includes a learning adjustment section configured to gradually increase the predetermined adjustment value as the learning processing is being performed.

2. The neural network load reduction device of claim 1, wherein the learning adjustment section is configured to increase the predetermined adjustment value by epoch units or iteration units.

3. The neural network load reduction device of claim 1, wherein the learning adjustment section is configured to increase the predetermined adjustment value in proportion to the first number of channels.

4. The neural network load reduction device of claim 1, wherein the channel selection section is configured to select, as the redundant channel, a channel in which the output feature value is below the predetermined threshold value.

5. The neural network load reduction device of claim 1, wherein:
  the execution of the program instructions by the computation device causes the neural network load reduction device to further provide functions of one of each of the attention module, the channel selection section, and the deletion section corresponding to each of the plurality of levels of processing layers; and
  the second learning unit is configured to perform learning processing on the neural network after the redundant channel has been deleted from each of the plurality of levels of processing layers.

6. The neural network load reduction device of claim 1, further comprising a plurality of attention modules corresponding to the plurality of levels of processing layers, the plurality of attention modules being common to some or all of the plurality of levels of processing layers.

7. The neural network load reduction device of claim 1, further comprising a plurality of attention modules corresponding to the plurality of levels of processing layers, the plurality of attention modules being different modules.

8. A neural network load reduction method comprising:
  computing, for a neural network including a plurality of levels of processing layers that are connected together by a plurality of channels, an output feature value corresponding to each channel of a first number of channels based on an input feature value from each channel of the first number of channels in a predetermined processing layer and based on a parameter, and
  multiplying the input feature values by the output feature values and outputting a computed result obtained to a processing layer at a next level from the predetermined processing layer;
  connecting to the neural network and performing learning processing on the parameter using an error backpropagation method in a state in which learning processing has been suspended at least for the predetermined processing layer and the processing layer at the next level;
  selecting, as a redundant channel, a channel satisfying a predetermined relationship between the output feature values computed after the learning processing has been performed and a predetermined threshold value;
  changing channels of the first number of channels into channels of a second number of channels by deleting the redundant channel from the predetermined processing layer; and
  connecting to the neural network and performing learning processing on the neural network after the redundant channel has been deleted, wherein
  the computing of the output feature value includes computing, as the output feature value, a result from taking a feature value according to the input feature value and the parameter, and multiplying the feature value by a value obtained by dividing the first number of channels by a predetermined adjustment value, and
  the performing learning processing includes gradually increasing the predetermined adjustment value as the learning processing is being performed.

9. A non-transitory computer-readable storage medium storing program instructions, execution of which by a computer causes the computer to function as a neural network load reduction device, the program instructions comprising:
  program instructions for implementing, by the computer, an attention module including:

an attention layer for a neural network, the neural network including a plurality of levels of processing layers that are connected together by a plurality of channels, the attention layer being configured to compute an output feature value corresponding to each channel out of a first number of channels based on at least an input feature value from each channel of the first number of channels in a predetermined processing layer and based on a parameter, and a computation section configured to multiply the input feature values by the output feature values and to output a computed result obtained to a processing layer at a next level from the predetermined processing layer;

program instructions for implementing, by the computer, a first learning unit connected to the neural network and configured to perform learning processing on the parameter using an error backpropagation method in a state in which learning processing has been suspended at least for the predetermined processing layer and the processing layer at the next level;

program instructions for implementing, by the computer, a channel selection section configured to select as a redundant channel a channel satisfying a predetermined relationship between the output feature values computed by the attention layer after the learning processing has been performed and a predetermined threshold value;

program instructions for implementing, by the computer, a deletion section configured to change channels of the first number of channels into channels of a second number of channels by deleting the redundant channel from the predetermined processing layer; and program instructions for implementing, by the computer, a second learning unit connected to the neural network and configured to perform learning processing on the neural network after the redundant channel has been deleted, wherein the attention layer is configured to compute, as the output feature value, a result from taking a feature value according to the input feature value and the parameter, and to multiply the feature value by a value obtained by dividing the first number of channels by a predetermined adjustment value; and the first learning unit includes a learning adjustment section configured to gradually increase the predetermined adjustment value as the learning processing is being performed.

* * * * *